United States Patent [19]

Iannelli

[11] 4,132,241

[45] Jan. 2, 1979

[54] FLOW CONTROL DEVICE

[75] Inventor: Frank M. Iannelli, Spartanburg, S.C.

[73] Assignee: Tannetics, Inc., Erie, Pa.

[21] Appl. No.: 732,036

[22] Filed: Oct. 13, 1976

[51] Int. Cl.² ............................................. F16K 15/14
[52] U.S. Cl. .................................. 137/102; 137/512;
137/512.15; 137/854
[58] Field of Search ........... 137/102, 218, 512, 512.15,
137/854

[56] References Cited

U.S. PATENT DOCUMENTS

| 2,610,859 | 9/1952 | Wilcox et al. | 137/102 |
| 2,953,153 | 9/1960 | Gaul | 137/218 |
| 3,037,522 | 6/1962 | Millan | 137/512.15 X |
| 3,606,904 | 9/1971 | Taylor | 137/102 |
| 3,967,635 | 7/1976 | Sealfon | 137/102 |
| 4,013,088 | 3/1977 | Gocke et al. | 137/218 X |

Primary Examiner—William R. Cline
Attorney, Agent, or Firm—Bailey, Dority & Flint

[57] ABSTRACT

A flow control device is provided for delivering a fluid flow in one direction only while providing for venting of a backflow of fluid in an opposite direction wherein a plurality of self-contained check valve units are slideably received in an elongated housing with one of the check valve units additionally functioning to control the venting of the back flow through an opening formed in the housing wall.

9 Claims, 3 Drawing Figures

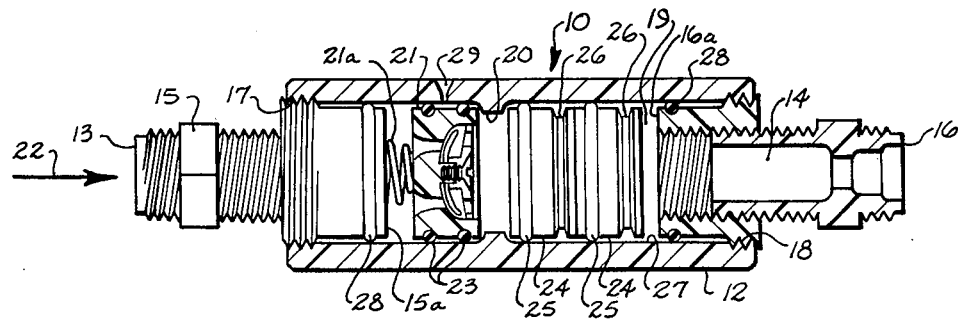
Fig.1
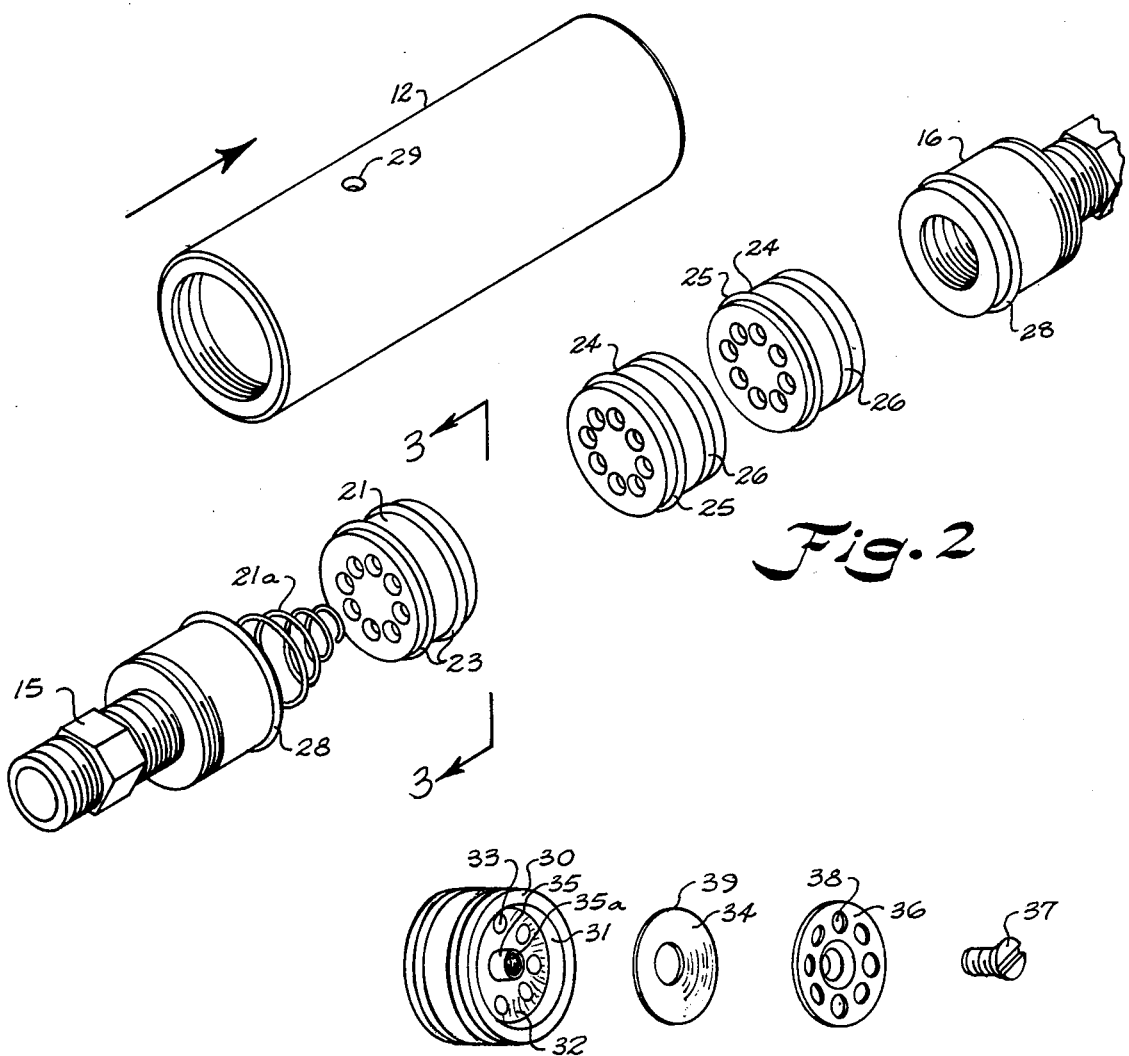
Fig.2
Fig.3

FLOW CONTROL DEVICE

BACKGROUND OF THE INVENTION

The prevention of back siphonage and back flow of water in a water supply system is a problem to which considerable attention need be given. This is particularly so where chemicals or gases are introduced in water coming from a sanitary water supply wherein the return of water from the end of the system where the chemical or gas is discharged could cause a contamination of the water supply. Such is the case in carbonated systems which utilize a carbonated gas in conjunction with a sanitary water supply system and in many steam cleaning operations which utilize chemicals on the discharge end. Prevention of backflow is also an important consideration in many other fluids supply systems other than water.

Conventional check valve arrangements have been utilized which permit a flow of fluid in one direction only. However, quite often the check valve member will fail resulting in a back flow of fluid through the fluid supply line. Therefore, many prior art check valve arrangements have been developed which utilize a safety pressure relief port to vent the backflow of fluid to the atmosphere should the check valve fail.

One such prior device is disclosed in U.S. Pat. No. 2,953,153 wherein a vented safety check valve is provided having a pair of spring biased pistons. The first piston is on the upstream side of a second master piston and functions to uncover a vent port to the atmosphere upon detecting failure of the master piston to seat properly and prevent backflow. Thus, should the master piston fail to seat on its seating rim, the first piston will be raised off of its valve seat by the back flow to vent the backflow to the atmosphere. Another much simpler device is shown in U.S. Pat. No. 3,346,001 wherein an atmospheric vent is provided for venting backflow to the atmosphere. A flexible valve member permits flow in one direction, however, when backflow occurs the flexible valve member is seated to prevent backflow through the valve while opening the vent to the atmosphere. While the prior devices have provided venting of backflow to the atmosphere upon failure of the main check valve member, it is desirable to provide a valve arrangement having increased reliability in its checking function in conjunction with more simplified safety venting.

SUMMARY OF THE INVENTION

A flow control device is disclosed for delivering a fluid flow in one direction only while providing for relief and venting of a backflow in an opposite direction. The flow control devices comprises an elongated cylindrical housing having an inlet and outlet port. An internal bore is formed within the housing for delivering a flow of fluid through the device. An internal abutment is formed within the housing extending into the bore cavity. A first check valve member is slideably received in the bore between the inlet port and the internal abutment for delivering a flow of fluid in the one direction. A second check valve member is slideably received in the bore on a downstream side of the internal abutment for delivering a flow of fluid in the one direction. A vent opening is formed in the housing between the internal abutment and the inlet port for venting the interior space defined by the bore with the atmosphere. The first check valve member has a first position abutting the internal abutment and covering and sealing the vent opening when flow is directed through the device in the one direction. The first check valve has a second position uncovering the vent opening to vent the interior space of the bore to the atmosphere should the second check valve member fail and permit a backflow of fluid to be delivered therethrough in the opposite direction so that the backflow is effectively vented to the atmosphere.

Accordingly, an important object of the present invention is to provide a flow control device which effectively prevents backflow of fluid upon check valve failure while maintaining a smooth and consistent flow at all other times.

Another important object of the present invention is to provide a flow control device incorporating a plurality of highly reliable check valve units in series so that backup checking is available upon failure of one of the check valve units.

Yet another important object of the present invention is to provide a flow control device wherein a plurality of self-contained check valve units are utilized and wherein one of the check valve units is utilized as both a check valve and as a valve for controlling a vent opening for venting backflow of fluid to the atmosphere should the check valve fail.

Yet another important object of the present invention is to provide a simple and highly reliable flow control device which utilizes a plurality of self-contained check valve units which are slideably received in the device and may be readily replaced within the flow control device.

Still another important object of the present invention is to provide a flow control device utilizing a series of aligned check valves wherein each check valve member is independently contained within its own housing and may be slideably replaced in the flow control device resulting in fewer moving parts and high reliability.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a side elevational cut-away view illustrating a flow control device as constructed in accordance with the present invention, FIG. 2 is an exploded perspective view of the various components comprising the flow control device of the present invention, and FIG. 3 is an exploded perspective view illustrating the various components of one of the self-contained check valve units as constructed in accordance with the present invention.

DESCRIPTION OF A PREFERRED EMBODIMENT

A flow control device is illustrated in the drawing for delivering a flow of fluid in one direction only while providing for relief and venting of a backflow of fluid in the opposite direction. The flow control device may be connected in the supply line of any fluid supply system such as a water supply line for preventing a reverse flow of the fluid. The flow control device has particular application with systems wherein a gas or chemical is introduced at the discharge end of the system to prevent a backflow of the chemical or gas solution from being delivered back to the water supply resulting in contamination thereof.

Referring now to FIG. 1 in detail, a flow control device is shown generally at 10 comprising a cylindrical elongated housing 12 having an inlet port 13 and an outlet port 14. The inlet and outlet ports may be provided by conventional coupling members 15 and 16, respectively. The inlet coupling 15 and the outlet coupling 16 may be threadably received in threaded openings 17 and 18 provided in the inlet and outlet ends of the housing 12. It is to be understood, of course, that any other suitable arrangements may be utilized for providing an inlet and outlet port. The coupling members 15 and 16 may then be connected in the fluid flow line in any conventional manner. An internal bore cavity 19 is formed within the housing providing a passageway through which a fluid flow may be delivered through the flow control device. The housing 12 is preferably made from a non-corrosive plastic, such as nylon.

An internal abutment 20 in the form of an annular ring is formed on an interior surface of the bore 19 within the interior of the housing 12 and extends into the bore cavity. A first check valve member 21 is slideably received in the bore 19 between the inlet port or coupling 15 and the internal abutment 20 for delivering the fluid flow in one direction only. The normal flow of fluid is from left to right in the direction of the arrow 22 as shown in FIG. 1. Of course, the check valve normally does not permit a flow in the opposite direction unless it fails in its checking function. The check valve 21 is normally urged against the abutment 20 under the biasing force of a spring 21a to occupy a first position.

A pair of second check valve members 24 is slideably received in the bore cavity 19 in serial flow alignment with each other. The double check valves provide a double checking action and are located between the internal abutment 20 and the outlet port coupling 16. The check valves 24 permit a flow of fluid in the normal direction while preventing a flow in the opposite direction and are identical to each other as well as with check valve 21.

A single O-ring seal 25 is carried in one of a pair of circular grooves 26 formed in the outer peripheral wall or housing of each check valve member. The O-ring seals the space between the interior surface 27 of the bore 19 and the check valve members so that flow is delivered only through the axial valve opening formed in the check valve members as will be more fully explained later.

The inlet coupling member 15 and the outlet coupling member 16 are also provided with sealing rings 28 in the form of conventional O-rings. The inlet coupling 15 includes an abutment face 15a with which check valve member 21 abuts under certain conditions. The outlet coupling 16 also has an abutment face 16a extending within the interior of the bore cavity 19 which may be in abutment with the face of adjacent check valve member 24 under certain flow conditions.

The check valve members 21 and 24 are identical except that check valve member 21 carries a pair of O-rings 23 in the grooves formed around it outer periphery whereas only a single O-ring is provided for the check valves members 24. An atmospheric vent 29 is formed in the cylindrical housing 12 and communicates the space within the bore cavity 19 with the atmosphere. The vent opening 29 is located between the inlet port 13 and the internal abutment 20. When the first check valve member 21 is in a first position abutting the internal abutment 20, as best seen in FIG. 1, the atmospheric vent opening 29 is sealed between the two O-ring members 23 and the check valve member 29 so that communication with the bore cavity 19 is cut off and an even flow of fluid may be directed through the check valve member 21. The check valve member 21 is movable to a second position by backflow pressure against the force of biasing spring 21a to a position where the atmospheric vent 29 is uncovered. In this position, the backflow will be checked by valve 21 and will be vented to the atmosphere through vent 29. This condition would occur when the double check valve arrangement 24 fails and permits the backflow fluid to be delivered in a direction opposite to that of the normal flow through flow control device. Thus, the backflow may be effectively vented to the atmosphere and is not allowed to contaminate the water supply.

The check valves 21 and 24 are carried coextensive within the bore 19 in that the circular cross-section of the check valve members is substantially equal to the circular cross-section of the interior bore cavity 19 except for a small space between the check valve members and the interior surface of the bore which is sealed by the O-rings 23 and 25. The check valve members may be readily moved by sliding them from the bore of the cylindrical housing 12 and may be replaced or repaired as often as necessary.

Referring now to FIG. 3, the check valve members 21 and 24 can be seen in more detail. Each of the check valve members includes a self-contained check valve unit comprising an axially bored housing 30 having a central passageway 31 extending therethrough. An inlet valve seat 32 is carried in the passageway having a plurality of circumferentially and radially spaced openings 33 spaced around the outer periphery of the valve seat. The plurality of holes 33 defines a valve opening in the valve seat 32 which permit a flow of fluid through the valve seat. The valve seat 32 is in the form of a concave disk which is preferably formed as one-piece with housing 30. A concave flexible diaphragm element 34 is carried over a hub member 35 having an internal threading opening 35a formed therein. The diaphragm element 34 seats against the concave valve seat 32 in the event of backflow to seal the inlet openings 33 preventing backflow through the device. Of course, the diaphragm is moved off of the valve seat 32 to permit a flow of fluid in the normal direction.

Each check valve unit 30 also includes an outlet valve seat in the form of a concave disk 36 carried adjacent the diaphragm element 34. The concave inlet valve seat 32, the concave diaphragm element 34, and the concave outlet diaphragm valve seat 36 are carried in serial axial alignment and are fastened within the check valve unit housing 30 by means of a conventional threaded screw member 37 which inserts into the threaded hole 35a. The housing 30 and concave disks 32 and 36 are preferably formed from a suitable plastic such as nylon.

It is important to note that the holes 38 spaced radially and circumferentially around the outer periphery of the outlet valve seat 36 have at least a portion, preferably two-thirds of the opening, which extends beyond the outermost edge 39 of the diaphragm element 34 when the diaphragm element is seated against the outlet valve seat so as to deliver the flow of fluid through the check valve unit.

The diaphragm element 34 is movable to a first position by fluid flow in the normal direction in which the diaphragm element is seated on the outlet valve seat leaving at least a portion of the outlet openings 38 uncovered while uncovering all of the inlet openings 33. The diaphragm element is then movable to a second position by a backflow of fluid to seat the diaphragm element on the inlet valve seat 32 covering the inlet openings 33 completely to prevent the backflow of fluid therethrough.

The biasing spring 21a urges the valve member 21 against the internal abutment 20 to a first position. The biasing spring 21a is of particular importance in that it permits the check valve member 21 to move to the second position in which the vented opening 29 is uncovered to vent the backflow of fluid and then returns the check valve member 21 to its first position against the abutment 20 once the venting has been accomplished. It is necessary that valve 21 be returned to the first position so that fluid flow in the normal direction is not vented to the atmosphere should normal flow again be established following the venting of a backflow. When using check valve member 21 alone without check valves 24, the spring 21a may be used to provide a predetermined force which allows valve 21 to be moved to its second position should backflow exceed a predetermined pressure providing a safety relief valve. However, when used in combination with valves 24 for increased checking reliability and to detect a failure in the checking of backflow by valves 24, the spring 24a would be appropriately sized to detect such a condition to allow for venting during such a condition.

Although the preferred embodiment is illustrated with a pair of check valve members 24 enclosed between the abutment 20 and the outlet coupling 16, it is to be understood that a single check valve member may be utilized. However, by using a pair of check valve members 24, a double checking of the fluid flow and increased relaibility are obtained. Actual failure of two check valve members must occur before venting of backflow is necessary.

It can be seen that an advantageous flow control device can be had when constructed in accordance with the present invention wherein a plurality of self-contained check valve units are provided which may be readily replaced and may slide conveniently in and out of the valve housing. Each check valve unit is self-contained and highly reliable and does not depend on any other moving parts within the flow control device in order to perform its function. Therefore, one of the check valve units may fail while the other one may still serve to function properly in preventing backflow of fluid to the flow control device. however, if total failure does occur of the check valve units, then the backflow of fluid is effectively vented from the flow control device. The flow control device has very few moving parts and the various parts of each individual check valve unit may be readily replaced and repaired after removing them from the flow control device.

While a preferred embodiment of the invention has been described using specific terms, such description is for illustrative purposes only, and it is to be understood that changes and variations may be made without departing from the spirit or scope of the following claims.

What is claimed is:

1. A flow control device for delivering a fluid flow in one direction only while providing for relief and venting of a backflow in an opposite direction, comprising:
   an elongated housing having an inlet and outlet port;
   an internal bore formed within said housing for delivering a fluid flow through said device;
   an internal abutment formed within said housing extending into said bore;
   a first check valve member slidably received in said bore between said inlet port and said internal abutment for delivering a flow of fluid in said one direction;
   a second check valve member received in said bore on a downstream side of said internal abutment for delivering a flow of fluid in said one direction;
   a vent opening formed in said housing between said internal abutment and said inlet port for venting the interior space defined by said bore with the atmosphere;
   said first check valve member having a first position abutting said internal abutment and covering and sealing said vent opening when flow is directed through said device in said one direction,
   said first check valve member having a second position in said bore between said inlet port and said vent opening uncovering and placing said vent opening in direct communication with said bore to vent the interior space of said bore to the atmosphere should said second check valve member fail and permit said backflow of fluid to be delivered therethrough in said opposite direction so that said backflow is effectively vented to the atmosphere:
   each said check valve member including a self-contained check valve unit which includes:
   a check valve housing having an axial bore formed therein;
   an inlet valve seat carried in said bore having an inlet opening;
   an outlet valve seat carried in said bore spaced in axial alignment from said inlet valve seat having an outlet opening;
   a diaphragm element carried in said bore between said inlet and outlet valve seats;
   said diaphragm element being movable to a first position by fluid flow in said one direction seated on said outlet valve seat leaving at least a portion of said outlet opening uncovered while uncovering said inlet opening; and
   a diaphragm element being movable to a second position by said backflow of fluid seated on said inlet valve seat covering said inlet opening completely preventing flow therethrough in said opposite direction; and
   a resilient biasing means urging said first check valve member against said internal abutment in said first position, said biasing means permitting said first check valve member to move to said second position for venting of backflow while returning said first check valve member to said first position once venting has been accomplished so as to prevent fluid flow in said one direction from being vented.

2. The device set forth in claim 1 wherein said first and second check valve members are carried co-extensive with said bore and include sealing rings carried in grooves formed on an outer periphery forming a seal between said valve members and an interior surface of said bore.

3. The device set forth in claim 1 wherein said second check valve member includes a pair of spaced grooves formed in an outer periphery thereof for receiving a pair of space sealing rings for sealing the space between said valve members and an interior surface of said bore so that said vent opening is further sealed between said sealing rings from fluid flow when said valve member is in said first position.

4. The device set forth in claim 1 wherein said inlet and outlet seats include concave disks, said inlet and outlet openings are defined by a plurality of holes radially and circumferentially spaced adjacent the outer periphery of said disks, said diaphragm element including a flexible concave disk element, and said circumferentially spaced holes defining said outlet openings being radially spaced beyond the outermost circumferential edge of said diaphragm disk when said diaphragm disk is moved to said first position.

5. The device as set forth in claim 1 wherein said internal bore is circular in cross-section and each said check valve member includes a self-contained check valve unit enclosed in a cylindrical housing having a circular cross-section approximately equal to the cross-section of said bore so that said check valve units may be slideably exchanged within said bore of said elongated housing for convenient replacement.

6. The device as set forth in claim 1 wherein a pair of said second check valve members are provided in axial alignment between said internal abutment and said outlet port.

7. A flow control device for delivering a fluid flow in one direction only while providing for relief and venting of a backflow in an opposite direction, comprising:
an elongated housing having an inlet and outlet port;
an internal bore formed within said housing for delivering a fluid flow through said device;
an internal abutment formed within said housing extending into said bore;
self-contained check valve means disposed co-extensively across said bore for slidable movement between said inlet port and said internal abutment, said check valve means including an internal passageway having inlet and outlet openings and flexible diaphragm seal means carried therebetween for delivering a flow of fluid in said one direction while preventing a backflow of fluid in an opposite direction;
a vent opening formed in said housing between said internal abutment and said inlet port for venting the interior space defined by said bore with the atmosphere;
said check valve means including second seal means for covering and sealing said vent opening from direct communication with said internal bore when in a first position abutting said internal abutment;
said check valve means having a second position uncovering and placing said vent opening in direct communication with said bore to vent the interior space of said bore to the atmosphere should said backflow of fluid in said opposite direction exceed a predetermined pressure for effectively venting said backflow to the atmosphere; and
a resilient biasing means urging said check valve means against said internal abutment in said first position, said biasing means permitting said check valve means to move to said second position for venting of backflow while returning said check valve means by movement in said one direction to said first position once excess pressure has been vented so as to prevent fluid from being vented to the atmosphere thereafter.

8. The device set forth in claim 7 wherein said second seal means includes sealing rings carried in grooves formed on an outer periphery of said check valve means forming a seal between said valve means and an interior surface of said bore.

9. The device set forth in claim 7 wherein said inlet and outlet openings include disk-shaped valve seats having a plurality of holes radially and circumferentially spaced adjacent the outer periphery of said disks, said seal means including a flexible diaphragm element, said circumferentially spaced holes defining said outlet openings being radially spaced beyond the outermost circumferential edge of said diaphragm element when said diaphragm element is moved to said first position for allowing flow therethrough while covering completely said inlet holes preventing said backflow therethrough.

* * * * *